Mar. 20, 1923.

A. ANDRESEN

COMBINED BUFFER AND BUMPER

Filed May 8, 1922

INVENTOR.
August Andresen
BY M. C. Frank
ATTORNEY

Patented Mar. 20, 1923.

1,449,210

UNITED STATES PATENT OFFICE.

AUGUST ANDRESEN, OF OAKLAND, CALIFORNIA.

COMBINED BUFFER AND BUMPER.

Application filed May 8, 1922. Serial No. 559,193.

*To all whom it may concern:*

Be it known that I, AUGUST ANDRESEN, a citizen of the United States, residing at 1020 28th Street, in the city of Oakland, county of Alameda, and State of California, have invented a new and useful Combined Buffer and Bumper, of which the following is a specification.

This invention relates in general to bumpers for vehicles, and more particularly to a combined buffer and bumper for automobiles.

The principal objects of my invention are, to produce an inexpensive combined device of the character mentioned, the buffer member of which adapted to easily absorb ordinary shocks due to blows received from any angle as now and then encountered, and the combined buffer and bumper adapted to withstand and without injury, quite heavy and severe shocks. Another object of the device being its adaptability to effectively dissipate or ward off thrusts, blows, or bumps received partially rearwardly and angularly or even endwise, as may be encountered by being hooked or side-swiped by a passing automobile or other object.

The above objects are accomplished by my novel connection, connecting the buffer to the bumper, and which connection consists in the buffer being provided with recurved ends and joined by shackles to the ends of the bumper, the said shackles pivotally connecting the said parts, and in a double set of springs between said bumper and buffer, one set of said springs being in tension and the other set in compression.

Other features of the invention will be set forth hereinafter, in connection with the accompanying one sheet of drawings in which I have illustrated my invention, and as applied to an automobile.

Figures 4, 5:
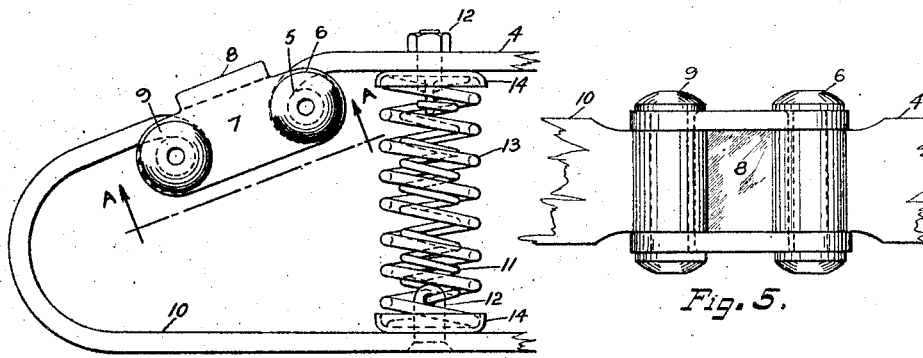
Figure 4 is an enlarged plan of one end of the device in its normal condition.
Figure 5 is an elevation of the parts of Figure 4, looking in the direction of the arrows from the line A—A.

In the figures:—The front of an automobile as 1, may be provided with brackets as 2, to which my invention may be attached by means of clips as 3. To the brackets 2, and adjustable thereon, as seen, is attached the bumper bar 4. This bar is curved at its ends to form eyes 5, as shown in Figure 4, to receive the bolts 6, and by which the shackles 7 are pivotally connected to the said eyes. These shackles are of U-shaped section, the arms of the U being above and below and extending inwardly and the bottom of the U at the back as at 8, whereby there is presented a solid back for a purpose to be presently set forth. The outer ends of the shackle arms are perforated to receive the bolts 9, which extend through the eyes on the ends of the buffer 10 similar to those of bumper bar 4. The buffer is thus shackled to the bumper. The buffer 10 may be made of spring steel, as is usual with such devices. Between the buffer 10 and the bumper 4 and connecting those parts together, are a series of coil-springs 11. These springs are maintained in a state of tension, and may be joined to the buffer and bumper members by hooking their ends through holes in the ends of stud or bolt members 12, as seen to greater advantage in Figure 4. Between the bumper and buffer members 4 and 10, are arranged a series of compression springs 13. These springs may be concentric with the tension springs 11, but are not necessarily so, and their ends may rest in saucers 14 which serve to center them. The compression springs 13 tend to keep the bumper and buffer members apart, and resist any collision or force having an opposite tendency. Thus the springs 11 tend to maintain the compression of springs 13, and springs 13 tend to maintain the tension of springs 11.

Figure 1:
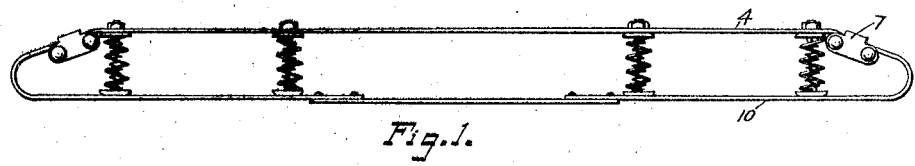
Figure 1 is a plan of the device by itself and as a separate article of manufacture.
Figure 2:
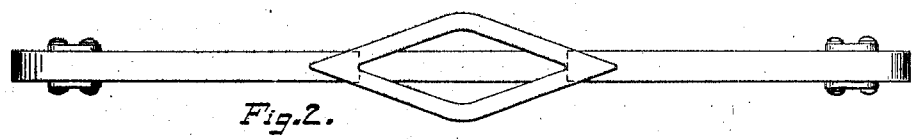
Figure 2 is a face or front elevation of the same.
Figure 3:
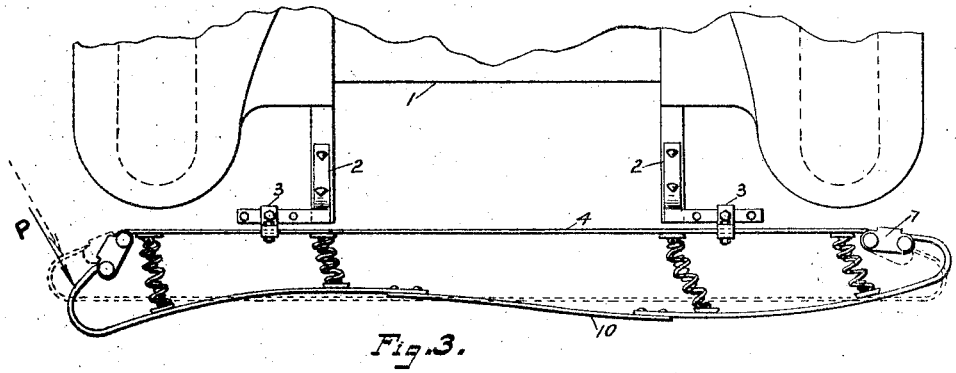
Figure 3 is a plan of the same attached to an automobile, and shown under one of the stresses which it is peculiarly adapted to resist, the dotted lines representing the normal position of the buffer member.

In the operation of my combined buffer and bumper, when a head-on collision or similar bump may occur, it will be resisted, first, by the stiffness of buffer bar 10, and second, by the springs 13, and third, by the springs 11 after the tension has been converted to compression, and fourth, by the stiffness of bumper bar 4. A bump to one corner of the vehicle will tend to distort the member 10, more or less as suggested in Figure 3, and will be resisted partly by one set of springs, and partly by the other, as well as by the stiffness of the buffer and bumper members. A bump from behind, as from the direction of the arrow P in Figure 3, will swing that end of the buffer member on the shackle bolts as pivots, and will be resisted by either or both sets of springs and by the buffer and bumper members, as clearly seen in Figure 3. The solid back at 8 of the shackle 7, prevents any projection catching and hooking into that part of my invention.

In the drawings I have shown only one specific form of my invention, and it is to be understood that the invention may be embodied in many different forms, each being a species of my invention, and the patent protection that I desire is all of that which comes within the spirit and scope of what I claim as new, and which claims are as follows:

1. In combination, a buffer and a bumper, and between those members two sets of springs, one set adapted for compression and one set adapted for tension.

2. In combination, a buffer and a bumper, and between those members two sets of springs, one set held in tension, and one set held in compression.

3. In combination, a buffer and a bumper, swiveled shackles connecting those members adjacent their ends, and between those members, springs, adapted to resist distortion of said members with reference to each other.

4. In combination, a buffer and a bumper, and between those members two sets of concentric coil-springs acting in opposition to each other.

5. In combination, a buffer and a bumper, and between those members two sets of concentric coil-springs acting in opposition to each other, and means for holding said springs in position to said members.

6. As a new article of manufacture, an automobile attachment, comprising a buffer member having recurved ends terminating in eyes and a bumper member having curved ends also terminating in eyes, and shackles adapted to pivotally engage said eyes, and spring elements engaging the said buffer and bumper members.

AUGUST ANDRESEN.